Jan. 23, 1962

A. FERRI 3,018,034

PROPULSION DEVICE FOR VERTICAL TAKEOFF AIRCRAFT

Filed Nov. 17, 1959

*INVENTOR.*
ANTONIO FERRI
BY
Curtis, Morris & Safford
*ATTORNEYS*

Jan. 23, 1962 A. FERRI 3,018,034
PROPULSION DEVICE FOR VERTICAL TAKEOFF AIRCRAFT
Filed Nov. 17, 1959 3 Sheets-Sheet 2

INVENTOR.
ANTONIO FERRI
BY
Curtis, Morris & Safford
ATTORNEYS

INVENTOR.
ANTONIO FERRI
BY
Curtis, Morris & Safford
ATTORNEYS

United States Patent Office 3,018,034
Patented Jan. 23, 1962

3,018,034
PROPULSION DEVICE FOR VERTICAL
TAKEOFF AIRCRAFT
Antonio Ferri, Rockville Centre, N.Y., assignor to General Applied Science Laboratories, Inc., Hempstead, N.Y., a corporation of New York
Filed Nov. 17, 1959, Ser. No. 853,574
4 Claims. (Cl. 230—116)

This invention relates to an aircraft which is able to take off vertically and then to fly horizontally at high speed.

An object of this invention is to provide an improved propulsion unit for vertically lifting an aircraft and the like.

Another object is to provide such a unit which is less subject to dynamic strain than previous units but yet very efficient for its size in terms of lift and fuel consumption.

These and other objects will in part be understood from and in part be pointed out in the description given hereinafter.

In the inventor's co-pending U.S. application Serial No. 706,639, there is described a lifting unit in the form of a compressor operating with a super-sonic tip speed. One such unit having a relatively small diameter of six feet is able to produce a downward thrust of the order 30,000 pounds with good fuel efficiency. The compressor in this earlier unit is driven by an annular ring nozzle assembly carried on the tips of the compressor blades, somewhat like the rim of a spoked wheel. The present invention provides an improved way of driving a compressor in this general kind of unit and makes the unit particularly suitable for use in jet aircraft originally designed for level flight to enable them to take off and land vertically.

In accordance with the present invention in one specific embodiment thereof, there is provided in conjunction with an aircraft a propulsion unit comprising a many bladed compressor which operates at or near super-sonic velocity to obtain a very large thrust force per unit of area. The compressor blades are uniquely shaped and near their tips become short turbine blades. Because of their unique shape, no annular ring or divider along the blades is required to separate their compressor portions from their turbine portions to prevent unwanted interaction or mixing of the gas streams acting separately on these portions. The turbine portions of the blades are driven at super-sonic velocity by gases exhausted downward over them from one or more frame-mounted annular nozzles. The gases to supply these nozzles are in turn obtained from one or more jet engines arranged in conventional manner on the aircraft to propel it in level flight, the flow axis of the main compressor being at right angles to those of these engines. By diverting part of the gases from these jet engines downstream of their internal compressors to the nozzles which power the main compressor, a tremendous force to initially lift the aircraft is obtained. Some flow through the conventional engines is retained, however, to provide stability and control for the aircraft. After the aircraft has reached sufficient height and speed, then the flow of gases to the nozzles of the main compressor is reduced or turned off and simultaneously the conventional engines will resume full operation to propel the plane in level flight, during which of course the vertical lift supplied by the main compressor is not needed. To land the plane vertically, this operation is repeated in reverse order.

In another embodiment of the invention the main compressor is positioned within an aircraft fuselage with the flow axis of the compressor parallel to the direction of level flight, the aircraft being designed to take off and land vertically on its tail. Power for the main compressor is obtained as before from one or more conventional jet engines, but now all of the available gases from these engines are diverted to the main compressor. This aircraft is particularly useful for missions requiring long-range, low-altitude flight to escape detection and interception. It is able to make super-sonic dashes at very low altitude for ground attack and bomb delivery.

A better understanding of the invention together with a fuller appreciation of its many advantages will best be gained from the following description given in connection with the accompanying drawings wherein.

Figure 1:
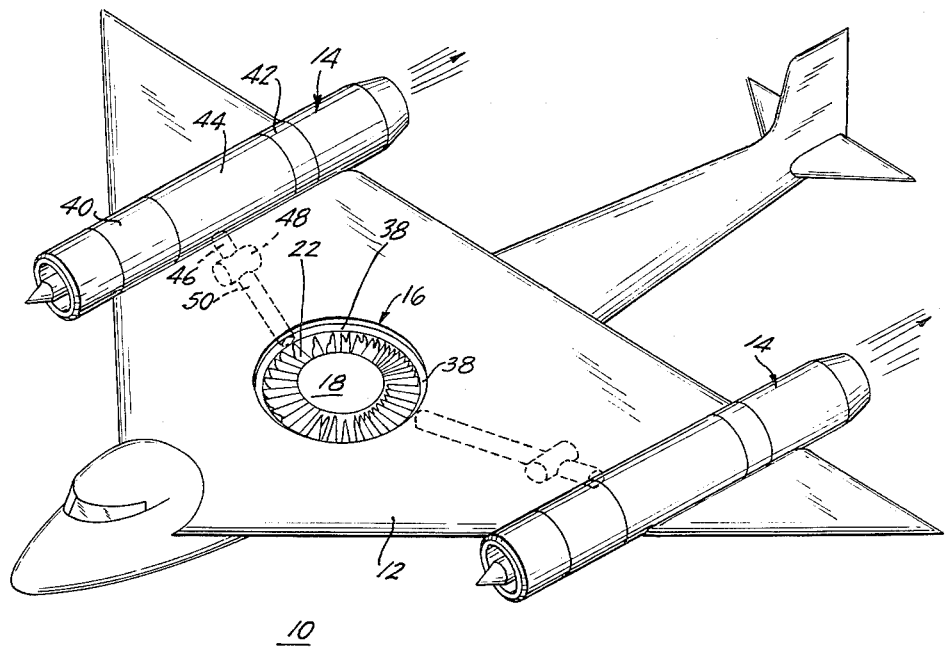
FIGURE 1 is a perspective view of an aircraft embodying features of the invention.

The aircraft 10 shown in FIGURE 1 has a delta wing 12 on which are mounted two high performance conventional jet engines 14 adapted to propel the plane at high speed in level flight. Centrally positioned within the wing between engines 14 is a vertical lifting unit 16 which, as will be explained in detail below, is driven by gases derived from the main engines to lift the plane vertically.

Figure 2:
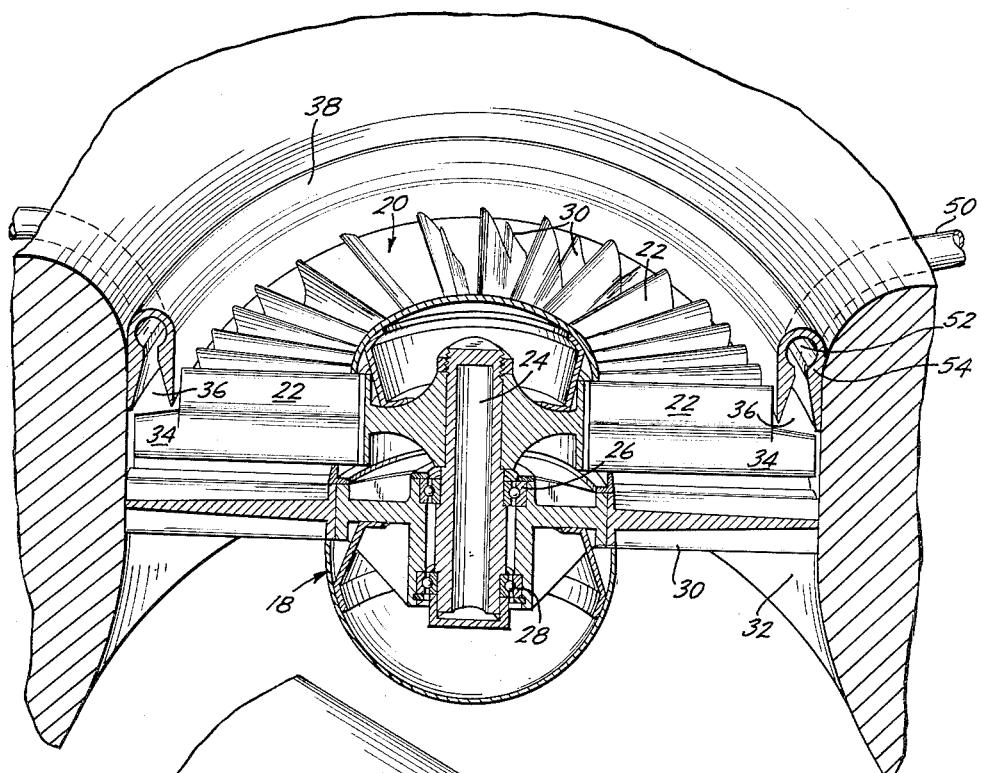
FIGURE 2 is an enlarged cross-section of the main compressor unit and nozzles.

As seen in FIGURES 1 and 2, unit 16 comprises a central hub 18 which rotatably supports a main compressor 20 having a multiplicity of blades 22. Hub 18 has a vertical shaft 24 which is journalled in the lower part of the hub, being supported therein by the bearings 26 and 28. This lower part of the hub is in turn rigidly supported by curved stator blades 30 whose outer ends are fixed to the wall 32 of wind 12 surrounding the opening through it. A second function of stator blades 30 is to remove lateral velocity components of the air expelled by compressor 20 so that the thrust will be straight downward.

Figure 3:
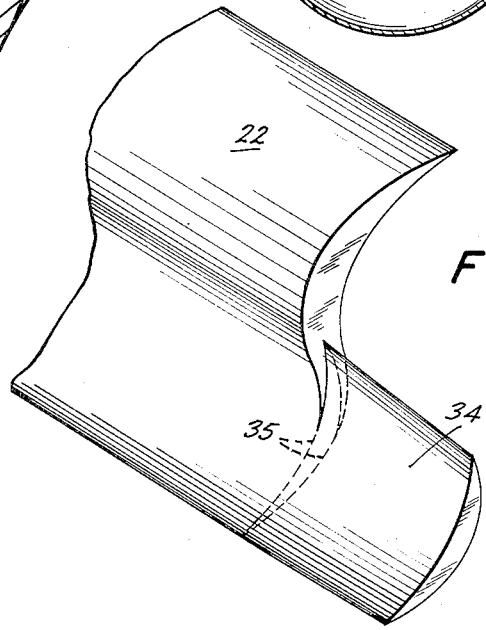
FIGURE 3 is a further enlarged perspective view of the tip portion of one of the compressor blades.

As seen in FIGURES 2 and 3, each of blades 22 is partly cut away on its outer end to leave a lower, outward projecting part 34. The inner part of each blade is somewhat S shaped in cross-section to give a net turn angle such that this part acts to compress the air when the blade is rotated about hub 18. Tip part 34 however comprises only the lower section of the S curve so that it acts as a turbine blade when subjected to a downward stream of gases. Each blade is advantageously an integral one-piece member. Because portion 34 is a smooth continuation of the bottom part of the blade without change in curvature there will be no or only minor change in static pressure laterally across their juncture indicated by the dotted lines 35 in FIGURE 3. Thus the gases separately involved with the compressor and turbine portions of each blade will not adversely affect the flow of one another. Therefore, no annular ring is required to separate the two gas flows.

FIGURE 2 shows blades 22 arranged to rotate around hub 18 with their outer tips or turbine portions 34 passing closely beneath the circular exhaust openings 36 of the annular nozzle 38, which is affixed to wall 32 of the wing of the plane and which extends 360° around the tips of blades 22. As seen in FIGURE 1, the nozzle ring 38 is supplied with gases from each engine 14. Each engine in conventional manner has within itself a forward compressor 40 and an after turbine 42 driven by it. Placed between these within the engine is a fuel combustion chamber 44 where a suitable fuel is burned to heat the air as it passes through the engine.

To supply the nozzle ring 38 with gases, each engine 14 just downstream of its compressor 40 is vented through a duct 46 to an auxiliary heating chamber 48 and thence through a duct 50 to the nozzle. Not all of the gases from engine compressor 40 are bypassed to a respective nozzle so that enough pass through the engine to produce drive for turbine 42 and to give a small amount of rearward thrust from the engine for stability. If desired, this rearward thrust can be diverted downward by suitable vanes (not shown) to assist main compressor unit 16 in lifting the aircraft. When it has reached a suitable height and speed, ducts 46 can be closed to permit engines 14 to operate in the conventional way.

The nozzle ring as seen in FIGURE 2 has an annular manifold 52 supplied by duct 50. Beneath this manifold is a sonic throat 54 so that the pressure around the manifold is equalized. The velocity of the gases expelled through opening 36 against turbine portions 34 of blades 22 is super-sonic so that blade flutter is minimized. Since nozzles 38 are stationary and mounted on wing 12, the strain on blades when rotating at high speed is much less than if the nozzles were supported by them.

For main engines having a total mass flow of 130 lb./sec., a design pressure ratio of 8 and a turbine inlet temperature of 2200° R., bypassing 50% of the flow through duct 46 will reduce the pressure ratio to 5. The remaining 50% of flow through the engines produces a rear thrust of about 30 pounds per pound per second of air entering the engines. The bypassed 50% after heating in chambers 48 to a temperature of 2800° R. at 5 atmospheres on being admitted to nozzles 38 will drive a compressor 6 feet in diameter having a hub to tip ratio of 0.4 with a tip speed of 1400 ft./sec. to give a downward thrust of about 30,000 pounds.

Figure 4:
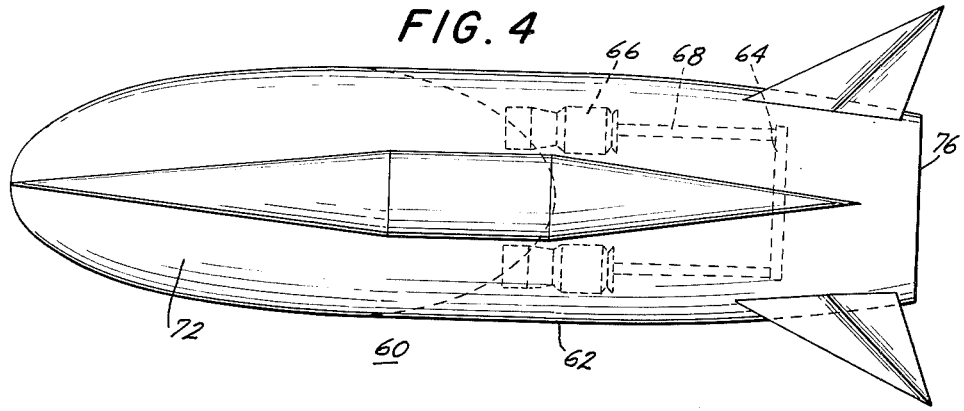
FIGURE 4 is a plan view of another aircraft using a similar compressor embodying the invention.
Figure 5:
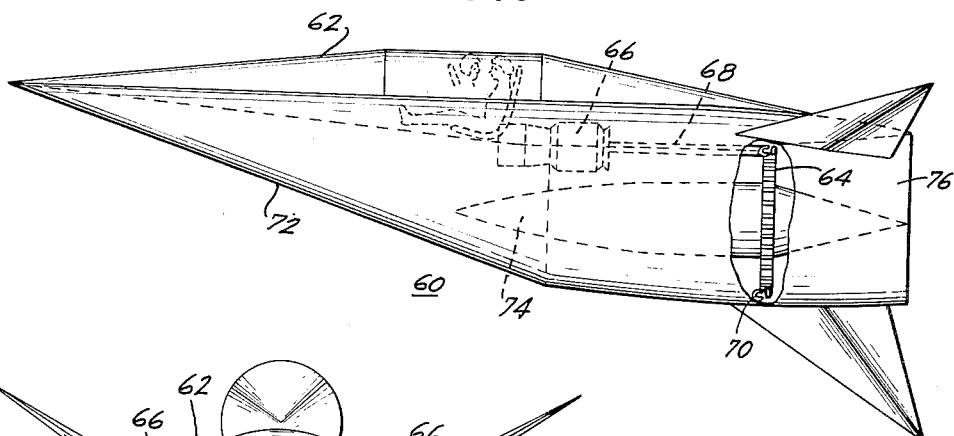
FIGURE 5 is a side view of the aircraft in FIGURE 4.
Figure 6:
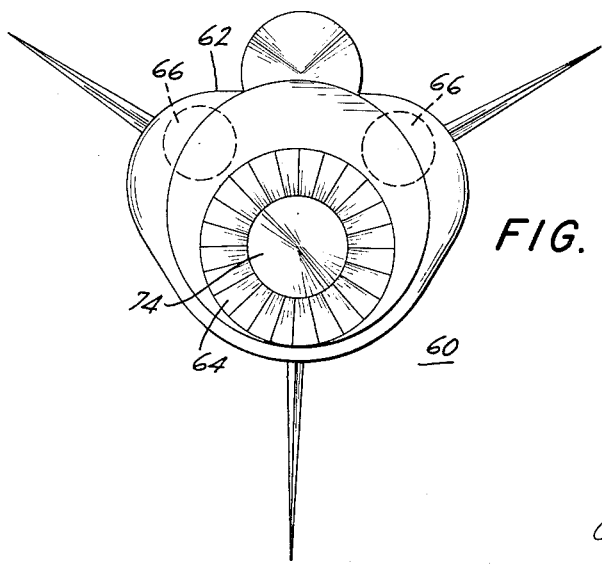
FIGURE 6 is a front view of the aircraft.

FIGURES 4, 5 and 6 show another embodiment of the invention. Here, an aircraft 60 has a barrel-shaped fuselage 62 which houses a main compressor 64, substantially the same as compressor 16, and a pair of auxiliary jet engines 66. The latter may be of conventional construction and all of the gases exhausted from them are led by ducts 68 to an annular nozzle 70, like nozzle 38, to drive the turbine blade tip portions of main compressor 64. Air is drawn into this compressor and engines 66 through a main opening 72 in the front of the fuselage, there being a conical member 74 centrally behind it to guide the in-flow to the main compressor. Gas is exhausted from it through a tail opening 76 with sufficient thrust to lift the plane off the ground and fly it from a tail-sitting position. This arrangement provides a very efficient way of obtaining sufficient thrust at suitable velocity to operate the plane from vertical takeoff position and up to several times the speed of sound.

The above description is intended in illustration and not in limitation of the invention. Various minor changes and modifications in the system and elements illustrated may occur to those skilled in the art and these may be made without departing from the spirit or scope of the invention as set forth.

I claim:
1. An improved propulsion device for an aircraft and the like, said device comprising a multi-blade compressor adapted to rotate around a hub with super-sonic tip velocity, each of said compressor blades having a short portion on its outer end shaped as a turbine blade, and an annular nozzle extending in an arc around the rim of said compressor closely above said turbine blade portions, said nozzle being adapted to direct a super-sonic flow of gas onto said portions to drive said compressor, said blades being S shaped in cross section and having inner compressor portions, said turbine portions comprising approximately the lower half of said S shape.

2. The device as in claim 1 wherein said nozzle has a super-sonic throat with an annular manifold above and a circular opening below.

3. The device as in claim 1 wherein the turbine portion of each blade is a smooth continuation of the compressor portion so that in operation there is minimal change in static pressure between said turbine and compressor portions.

4. An improved propulsion device for an aircraft and the like, said device comprising a multi-blade compressor adapted to rotate around a hub with super-sonic tip velocity, each of said compressor blades having a short integral portion along its length shaped as a turbine blade, and at least one annular nozzle extending in an arc coaxial with said hub closely above said turbine blade portions, said nozzle being adapted to direct a high speed flow of gas onto said portions to drive said compressor, said blades being generally S shaped in cross-section with said turbine blade comprising approximately only half the width of its respective compressor blade.

References Cited in the file of this patent

UNITED STATES PATENTS

| | | |
|---|---|---|
| 864,399 | Wing | Aug. 27, 1907 |
| 1,929,778 | Goddard | Oct. 10, 1933 |

FOREIGN PATENTS

| | | |
|---|---|---|
| 67,737 | France | Oct. 7, 1957 |
| | (Addition to No. 1,068,404) | |
| 217,516 | Australia | Aug. 10, 1958 |